Oct. 6, 1964  B. J. HECKERT  3,151,628
FLOW REGULATOR
Filed May 1, 1961

INVENTOR.
BRUCE J. HECKERT
BY R. E. Geanger
ATTORNEY 3,151,628
FLOW REGULATOR
Bruce J. Heckert, Canoga Park, Calif., assignor to The Marquardt Corporation, Van Nuys, Calif., a corporation of California
Filed May 1, 1961, Ser. No. 106,574
5 Claims. (Cl. 137—500)

This invention relates to fluid flow control apparatus and more particularly to a force-balance fluid flow restriction valve which is responsive to an input pneumatic signal to provide a preset flow rate.

This invention provides a fluid flow regulator which is responsive to a differential pressure pneumatic control signal for regulating flow through a conduit at a rate determined by the pneumatic control signal. Apparatus of this type has wide application and its utility will be readily apparent to those versed in the art. For example, the novel and improved flow regulator of the invention may be applied to turbojet fuel control or water injection control as well as ratio and propellant main flow control in liquid rocket engines. Other applications will be apparent to those skilled in the art. The mechanism illustrated and described hereinafter and embodying the principles of the invention is relatively simple in its design and inexpensive in its manufacture.

A principal object of the invention is to provide improved flow control apparatus.

A further object of the invention is to provide novel and improved apparatus for regulating the flow of fluid through a conduit at a predetermined flow rate.

A still further object of the invention is to provide novel and improved apparatus for regulating fluid flow through a conduit so as to maintain a predetermined flow rate which is proportional to a pneumatic input signal comprising a differential pressure.

Yet another object of the invention is to provide in flow regulator apparatus, improved means for varying the flow rate in a conduit in response to a pneumatic signal.

Other objects and advantages of the present invention will become apparent from a consideration of the appended specification, claims and drawings, in which:

Figure 1:
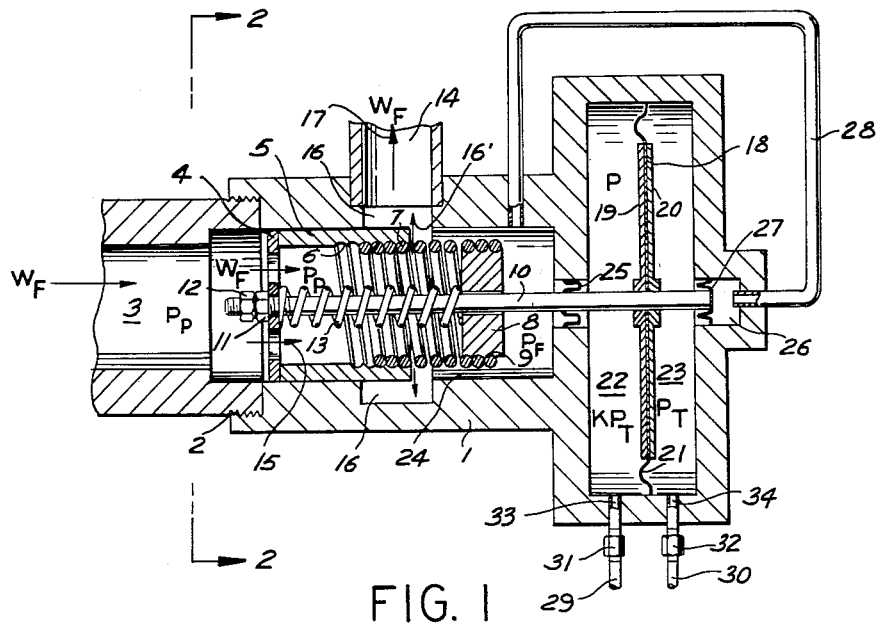
FIGURE 1 illustrates, somewhat diagrammatically, a cross section of a fluid flow regulator mechanism embodying the principles of the present invention.

Looking now at FIGURE 1, the regulator apparatus is housed and supported within casing 1, a portion of which serves as a stationary valve body, as will be made more apparent hereinafter. Casing 1 may be of cylindrical shape as shown more clearly in FIGURE 2. The extended portion of small diameter is provided with a threaded coupling 2 by means of which the apparatus may be attached to an inlet conduit 3. Fluid entering through conduit 3 (represented as $W_F$) passes through openings in plate 4 into a substantially cylindrical chamber 24. The openings in plate 4 may, for example, consist of four circular apertures as shown in FIGURE 2. These apertures comprise series orifices which act to linearize the flow rate versus pressure characteristic of the device, as will be explained more fully in a subsequent portion of this specification.

Chamber 24 has an enlarged portion 16 annularly disposed about the cylindrical axis of chamber 24. Cylindrical valve member 5 is rigidly affixed to plate 4, is located within chamber 24 and is adapted for sliding engagement therewith. After any change in equilibrium conditions of the regulator, whether this change results from a change in the pressure differential on diaphragm 18 or from a change in inlet pressure ($P_p$) or outlet pressure, the disc member 8 will again place upon the spring 7 a tension which is equal and opposite to the force on a diaphragm 18 so that a new condition of equilibrium can result. Therefore, for each control force on diaphragm 18, there is a given value of flow area between the coils of spring 7 and this same flow area will exist regardless of the equilibrium position of the valve member 5. In other words, the disc member 8, upon a change in any one of the above conditions, will assume a position along the rod 10 which will cause the valve member 5 to produce a pressure $P_f$ such that $P_p-P_f$ acting on the disc member 8 will just balance the pressure differential on diaphragm 18. Therefore, for each value of the pressure differential on diaphragm 18, there is a given equilibrium displacement of spring 7, and the equilibrium position of valve member 5 and disc member 8 will vary with inlet and outlet pressures. The cylindrical chamber in which valve member 5 is located has an enlarged central portion 16 which provides an outlet passage in communication with outlet conduit 14, the latter of which passes through a wall of casing 1. The rate of flow from inlet conduit 3 to outlet conduit 14 is determined by the position of valve member 5, since the position of that member determines the amount of restriction of central opening 16. Valve member 5 is provided with a plurality of spiral grooves 6 annularly disposed about the interior surface of one end thereof. Spiral grooves 6 are designed to engage and hold one end of helical spring 7. Disk member 8 serves to close one end of spring 7 and carries a plurality of exterior spiral grooves 9 which are designed to mate with and hold the end of spring 7 opposite from the end held by valve member 5. That is, helical spring 7 is threadedly attached to the interior of valve member 5 and to the exterior groove portion of disk member 8. Disk 8 is provided with a central aperture through which rod 10 may freely pass. This arrangement will cause rod 10 to aid in maintaining the alignment of spring 7. The first end of rod 10 passes through a central aperture in plate 4, and is provided with a threaded portion which carries adjustment nut 11 and lock nut 12. Bias spring 13 encircles a portion of rod 10 between plate 4 and disk 8 and exerts a force which tends to urge disk 8 in a direction away from plate 4.

Fluid ($W_F$) entering through inlet conduit 3 passes through the series orifice in plate 4 in the direction of arrows 15; the fluid then passes through the clearances between adjacent coils of spring 7 in the direction of arrows 16' into passage 16. The fluid in passage 16 then passes out of the apparatus via conduit 14 in the direction of arrow 17.

The position of valve member 5 is controlled by rod 10, which in turn depends upon a differential pressure input signal. Pneumatic control signals are supplied to the apparatus by means of a differential pneumatic mechanism comprising a pair of pressure chambers (22 and 23) separated by diaphragm 18. Each side of diaphragm 18 carries a stiffening plate (19 and 20). Plates 19 and 20 have central collar portions which are fixedly attached to rod 10. Diaphragm 18 has a peripheral compliant section 21, the outer extremity of which is bonded to the interior wall of casing 1 thereby providing a flexible seal between chamber 22 and chamber 23. A flexible seal 25, surrounding rod 10 isolates chamber 24 from pressure chamber 22. Similarly, chamber 23 is isolated from chamber 26 by means of flexible seal 27 attached to the end of rod 10. Chamber 26 is coupled to chamber 24 via tube 28 thus providing an equalizing pressure on the outer surfaces of seals 25 and 27, respectively.

Differential pneumatic control signals are provided through conduits 29 and 30 which communicate with chambers 22 and 23, respectively, via ports 33 and 34. Conduits 29 and 30 may be provided with coupler fittings 31 and 32 of any suitable and well known construction.

The flow regulating mechanism essentially comprises extension spring 7 which is connected to fluid flow restriction valve member 5 which is in slidable engagement with casing 1 and is operated via rod 10 by an inlet pneumatic signal acting against diaphragm 18.

Inlet fluid pressure acting against disk member 8 will extend spring 7 thereby providing clearances between adjacent working coils of said spring. The flow through the clearance between adjacent coils of extension spring 7, with one end closed off by disk member 8, is proportional to the pressure differential across spring 7 raised to the three-halves power ($K\Delta^{3/2}$, where K=spring constant, assuming a zero preload). An extension spring has a preload characteristic which must be overcome before displacement can occur. In order to overcome the preload characteristic of extension spring 7, a low rate compression spring 13 is used. The addition of a series orifice aids in linearizing the flow characteristic. With a proper choice of orifice acting in series with the clearances of the extensible spring, a proportionately restricted flow over a wide flow range is obtained. The series orifice is provided by the apertures in plate 4.

The pneumatic pressure in chamber 23 may be represented by $P_T$ and the pressure in chamber 22 by $KP_T$. An increase in the differential input pneumatic signal, $P_T-KP_T$, across diaphragm 18 must be balanced by an increase in fluid pressure differential to satisfy the force balance. An increase in $P_T-KP_T$ increases the restriction valve opening by causing valve member 5 to be displaced toward inlet conduit 3. This action will tend to open the valve and decrease the fluid pressure in chamber 24 ($P_F$). The fluid pressure differential between the interior of valve member 5 (and closed spring 7) and chamber 24, as represented by $P_P-P_F$ acting across spring 7 therefore increases, increasing the spring force which is transmitted to the restriction valve member 5. This force is fed back and compared with the input signal force $P_T-KP_T$. Thus, the pneumatic input signal schedules the fluid pressure diffeerntial across spring 7, which in turn is a function of fluid flow.

In addition to the regulating action described above, neglecting the Bernoulli force of the restriction valve, the device is insensitive to variations in upstream or downstream fluid pressure. Assuming that the input pneumatic signal $P_T-KP_T$ demands a specified flow rate, $W_F$, and that the supply pressure is $P_P$, then, if the supply pressure $P_P$ increases, the increased force acting on the disc 8 transmits a force to valve member 5 moving it toward the diaphragm 18 overcoming the diaphragm force and restricting the flow area of the outlet passage defined by the enlarged central portion 16. This increases pressure $P_F$ in chamber 24 on the downstream side of the spring 7 until the increase in $P_F$ matches the increase in $P_P$ such that the pressure differential $P_P-P_F$ is the same as prior to the increase in $P_P$, thereby reestablishing the steady state force balance dictated by $P_T-KP_T$. Since there is no change in $P_P-P_F$, there is no change in the flow rate $W_F$.

Figure 2:
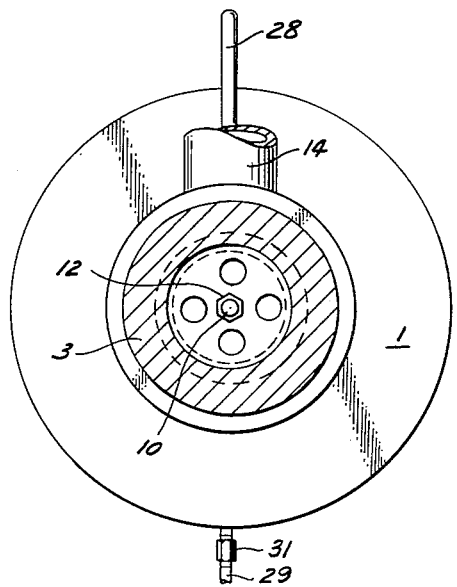
FIGURE 2 illustrates a sectional view of the apparatus taken along the line 2—2 of FIGURE 1.

Should the upstream pressure $P_P$ decrease, the pneumatic pressure $P_T-KP_T$ acting on the diaphragm 18 is now larger than $P_P-P_F$ and the valve member 5 is moved to the left, as viewed in FIGURE 1, by the force exerted through rod 10. This increases the area of the outlet passage 16, resulting in a decrease in pressure $P_F$ in chamber 24 until $P_P-P_F$ returns to its original value to achieve a steady state force balance dictated by the value of $P_T-KP_T$. Since the net value of $P_P-P_F$ does not change, $W_F$ does not change although $P_P$ decreased.

If the pressure in the outlet conduit 14 increases, an immediate increase in $P_F$ occurs. $P_P-P_F$ then momentarily decreases, resulting in a larger force acting momentarily against the diaphragm 18 to drive the valve member 5 to the left, as viewed in FIGURE 1, which decreases $P_F$ by increasing the area of the outlet passage 16 until the difference between $P_P$ and $P_F$ returns to its original value. Since $P_P-P_F$ does not change, $W_F$ does not change.

In summary, restrictor valve element 5 maintains $$(P_T-KP_T)=K_2(P_P-P_F)$$

and extension spring 7 and the series orifice maintain $$W_F=K_1(P_P-P_F)$$

The flow-input pneumatic pressure slope characteristic may be adjusted by varying the number of open or working coils of extension spring 7 ($W_F$ and N).

The disclosure given up to this point is intended only to explain the fundamental mechanical arrangement of a typical embodiment of the invention. It is to be understood that various omissions, substitutions and changes in the form and details of the device illustrated and in its operation may be made by those skilled in the art, without departing from the spirit of the invention. For example, the coils of helical spring 7 have been shown as having a circular cross-section as would result from their fabrication from round spring wire. However, a helical spring fabricated from wire of square or other polygonal cross section, having coils thereof provided with plane faces, closely engaging each other, will provide an extremely tight seal in the closed position. Also, the pneumatic differential pressure mechanism for providing the control signal input may be replaced with its electromechanical, or hydraulic equivalent, as will be obvious to those versed in the art. Many other advantages, features and additional objects of the present invention will become manifest to those versed in the art; therefore, it is intended that the invention be limited only as indicated by the scope of the following claims.

What is claimed is:
1. A fluid flow regulator comprising:
   a flow passage comprising a fluid inlet opening and a fluid outlet port;
   valve means movable within said passage for varying the area of said outlet port;
   coil spring means in said passage having one end connected to said valve means;
   means enclosing the other end of said spring means so that fluid entering said passage will flow through said spring means prior to entering said outlet port and exert a force against said enclosing means and said spring means in a direction to reduce said outlet port; and
   control means connected with said valve means for exerting a force on said valve means opposite to said spring means to produce a fluid flow through said spring means and regulator proportional to said control force, said spring means positioning said valve means to produce a pressure drop across said spring means proportional to said control force.

2. A regulator as defined in claim 1 wherein said control force producing means comprises:
   differential pressure responsive means for producing a variable control force proportional to the desired rate of fluid flow through the regulator.

3. A regulator as defined in claim 1 having spring biasing means for applying a bias force to said spring means, thereby overcoming the preload characteristic of said spring means.

4. A fluid flow regulator comprising:
   a casing having a fluid inlet opening and an outlet port in the side thereof;
   a hollow sleeve valve member slidably mounted in said casing for varying the area of said outlet port;
   coil spring means in said casing having its downstream end connected to the upstream end of said valve member for urging said valve member in the upstream direction to reduce said outlet port;

an impervious disc closing the upstream end of said spring member so that said spring means defines a chamber between said upstream and downstream ends thereof through which fluid flows from the interior of said valve member to said outlet port; and control means for producing a control force on said valve member in a direction opposite to the force of said helical spring produced by the pressure drop of the fluid flow through said spring means acting on said disc, said valve means being moved by said spring means to regulate the back pressure on said disc and provide a pressure differential force on said spring means proportional to said control force to thereby produce a flow rate through said spring means and said regulator proportional to said control force and independent of pressure variations at said inlet opening and said outlet port.

5. A fluid flow regulator as defined in claim 4 including an orifice plate mounted in said casing intermediate said inlet opening and said spring means for linearizing the flow characteristics through said spring means.

References Cited in the file of this patent

UNITED STATES PATENTS

| | | |
|---|---|---|
| 960,080 | Ellsworth | May 31, 1910 |
| 2,369,005 | Anschicks | Feb. 6, 1945 |
| 2,569,285 | Brown | Sept. 25, 1951 |
| 2,694,409 | Rawley | Nov. 16, 1954 |
| 2,960,107 | Falconer | Nov. 15, 1960 |